United States Patent [19]

Kim et al.

[11] Patent Number: 5,250,240
[45] Date of Patent: Oct. 5, 1993

[54] PROCESS FOR THE PREPARATION OF POROUS POLYOLEFIN SEPARATION MEMBRANES VIA THERMALLY-INDUCED PHASE SEPARATION

[75] Inventors: Jae-Jin Kim; Sung-Soo Kim; Jeong-Rim Hwang; Sang-Bong Suh, all of Seoul, Rep. of Korea

[73] Assignee: Korea Institute of Science and Technology, Seoul, Rep. of Korea

[21] Appl. No.: 913,405

[22] Filed: Jul. 15, 1992

[30] Foreign Application Priority Data

Aug. 9, 1991 [KR] Rep. of Korea ............... 13777/1991

[51] Int. Cl.⁵ ..................... D01D 5/24; D01D 5/247; D01F 6/04
[52] U.S. Cl. ........................ 264/41; 264/85; 264/203; 264/209.3; 264/209.4; 264/209.5; 264/211; 264/561
[58] Field of Search ............... 264/41, 49, 85, 178 F, 264/184, 203, 205, 209.1, 209.3, 209.4, 209.5, 211, 555, 561

[56] References Cited

U.S. PATENT DOCUMENTS

| | | | |
|---|---|---|---|
| 4,247,498 | 1/1981 | Castro | 264/41 |
| 4,539,256 | 9/1985 | Shipman | 428/315.5 |
| 5,120,594 | 6/1992 | Mrozinski | 264/41 X |

*Primary Examiner*—Leo B. Tentoni
*Attorney, Agent, or Firm*—Oblon, Spivak, McClelland, Maier & Neustadt

[57] ABSTRACT

A process is provided which allows economical production of polyolefin separation membranes having various structures, porosities and pore sizes. The process involves using a melt blend solution consisting of a polyolefin such as polypropylene or polyethylene and a diluent selected from the group consisting of natural soybean oil, pure linoleic acid, or a mixtures of oleic acid, linoleic acid and palmitic acid.

12 Claims, 12 Drawing Sheets

F I G. 5(B)
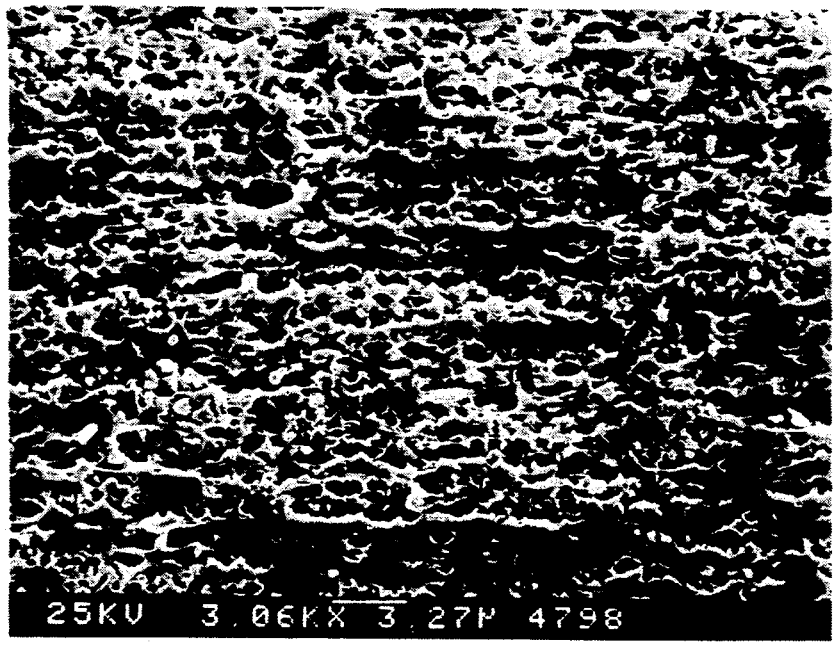
F I G. 5(C)
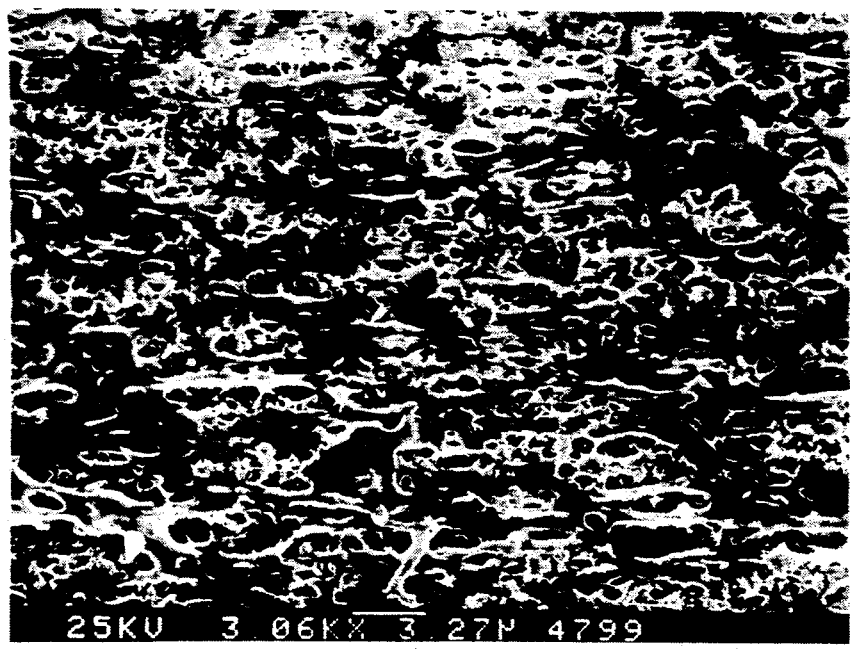

F I G. 8(B)
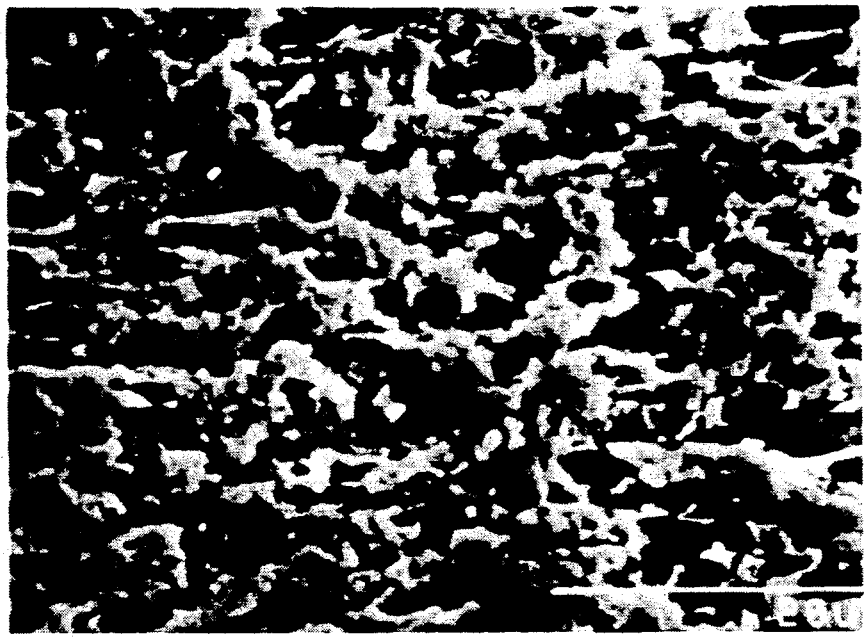
F I G. 8(C)
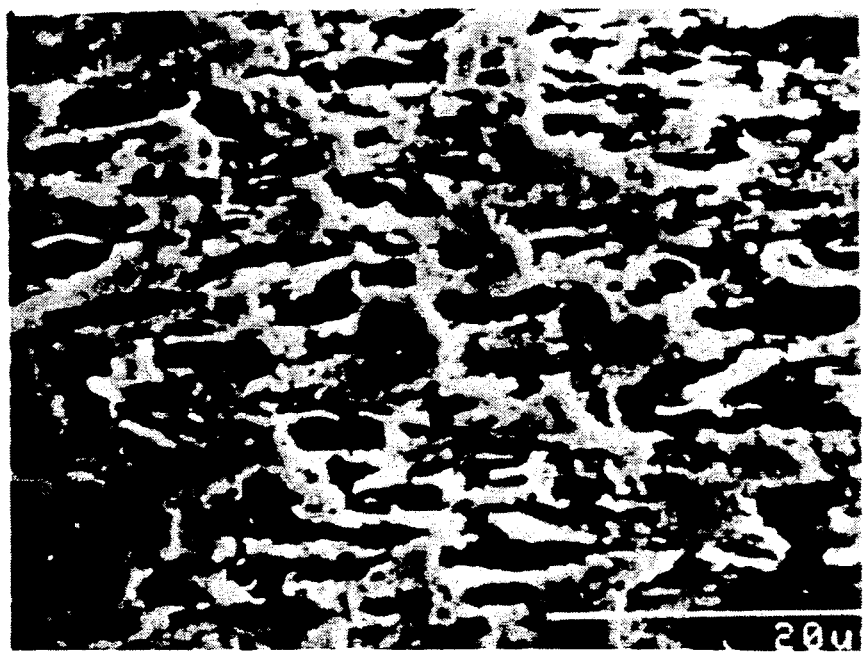

PROCESS FOR THE PREPARATION OF POROUS POLYOLEFIN SEPARATION MEMBRANES VIA THERMALLY-INDUCED PHASE SEPARATION

BACKGROUND OF THE INVENTION

1. Field of the Invention

The present invention relates to an improvement in the production of porous separation membranes from polyolefins such as polypropylene and polyethylene via thermally induced phase separation.

2. Description of the Prior Art

Hitherto, a wide variety of methods have been developed and suggested for preparing microporous membranes and films.

For example, U.S. Pat. No. 4,539,256 to Shipman discloses a microporous sheet material, a method of making the same, and articles of manufacture according to the method. This patent teaches a method comprising the steps of melt blending a semicrystalline thermoplastic polymer with a particular type of blending compounds, forming a shaped article of the melt blend, cooling the shaped article to cause phase separation between the thermoplastic polymer and the compounds, and orienting the article to provide a network of interconnected micropores.

U.S. Pat. No. 4,247,498 to Castro discloses the preparation of microporous polymer products having a homogeneous, three-dimensional cellular structure which comprises heating a thermoplastic polymer with an appropriate compatible liquid to form a homogeneous solution, cooling the resulting solution to initiate liquid-liquid phase separation, and subsequently continuing said cooling to solidify the polymer, and to remove the liquid to form a microporous material.

The foregoing prior art techniques have not, however, been commercially succeeded probably due to the lack of economic feasibility of the techniques. Thus, there has existed a need for facile processes which allow economically viable production of porous polymer membranes and films.

SUMMARY OF THE INVENTION

An object of the invention is to provide an economical process for preparing a planar, porous polyolefin separation membrane.

Another object of the invention is to provide an economical process for preparing a hollow, fibrous, porous polyolefin separation membrane having a controlled structure, porosity, and pore size.

Yet another object of the invention is to provide a facile method for efficiently controlling the structure and the size of pores of the porous separation membranes.

Still yet another object of the invention is to provide a method for affording an improved dimensional stability to the highly porous separation membranes according to the invention.

A further object of the invention will become apparent to those skilled in the art through reading the remainder of the specification.

These and other objects of the invention can be achieved by the process according to the invention, wherein melt blends of polyolefins with a diluent selected from the group consisting of natural soybean oil, pure linoleic acid, and a mixture of oleic acid, linoleic acid and palmitic acid are used, and various process conditions are controlled in an appropriate manner.

BRIEF DESCRIPTION OF THE DRAWINGS

The present invention will be further described with reference to the accompanied drawings, wherein:

FIGS. 5(a) through 5(c) are surface photomicrographs of the hollow fibrous separation membranes manufactured from a melt blend composed of 40% by weight of polypropylene and soybean oil by varying spinning rates, which show the effect of the spinning rates on the pore sizes of the membranes;

FIGS. 8(a) through 8(c) are surface photomicrographs of the hollow fibrous separation membranes manufactured from a melt blend composed of 30% by weight of polyethylene and soybean oil by varying winding ratios, which show the effect of the winding ratio on the surface structure of the membrane.

DETAILED DESCRIPTION OF THE INVENTION

Figure 1:
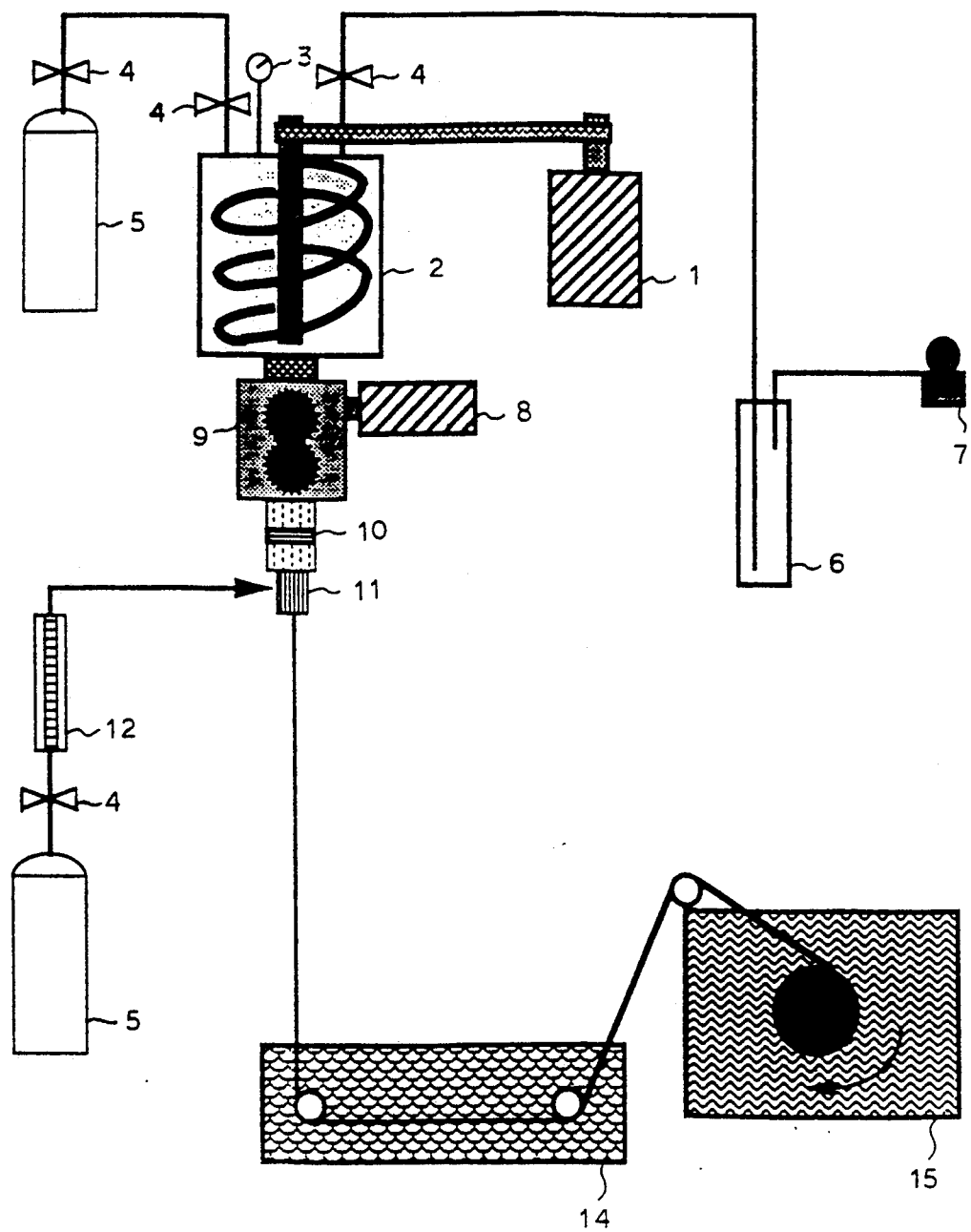
FIG. 1 is a diagrammatical representation of an embodiment of the apparatus for use in the production of a hollow fibrous separation membrane in accordance with the present invention.

In an aspect, the present invention provides a process for preparing a planar, porous polyolefin separation membrane, which comprises the steps of:

forming a film from a melt blend solution containing a polyolefin, having a melt index of 0.1 to 30 g/10 min, selected from group consisting of polyethylene and polypropylene, in a diluent selected from the group consisting of natural soybean oil, pure linoleic acid, and a mixture of oleic acid, linoleic acid and palmitic acid;

cooling the film;

extracting out the diluent with an extracting solvent; and evaporating out the extracting solvent together with any residue of the diluent.

In another aspect, the present invention provides a process for preparing a hollow fibrous, porous polyolefin separation membrane, which comprises the steps of:

spinning a melt blend solution containing a polyolefin, having a melt index of 0.1 to 30 g/10 min, selected from the group consisting of polyethylene and polypropylene, in a diluent selected from the group consisting of natural soybean oil, pure linoleic acid, and a mixture of oleic acid, linoleic acid and palmitic acid to form a membrane;

extracting out the diluent followed by coagulating the membrane with a coagulating and extracting solvent; and evaporating out the solvent together with any residue of the diluent.

As described above, the present invention involves use of a diluent selected from the group consisting of natural soybean oil, pure linoleic acid, and a mixture of oleic acid, linoleic acide and palmitic acid, and the like. These diluents are miscible with polyolefins at a high temperature to form polyolefin melt blends. However, the melt blends once formed may give rise to a liquid-liquid or solid-liquid phase separation depending on the cooling conditions employed and the compositions of the blends used. By exploitation of such properties, the present invention affords various porous structures including cell- and micro-structures to the resulting polyolefin separation membranes.

The diluents according to the invention are suitable for the production of membranes for medical treatment, biological process, food manufacturing, etc., because they are non-toxic and can be easily removed after the construction of the desired porous structures. In addition, when the diluents according to the invention are used, planar or hollow fibrous, porous separation membranes can be readily prepared by means of conventional techniques such as a melt extrusion and melt spinning technique. Among the above diluents, soybean oil is most preferably used because it is a naturally occuring substance and thus easily available at a low price.

Polyolefins suitable for use in the present invention have a melt index of 0.1 to 30 g/10 min and may be used in the melt blends at a concentration of 10 to 80% by weight. Within this concentration range, it is possible to form the desired separation membranes.

A planar separation membrane can be made by melt extrusion using a slit die, a compression molding, and a slow cooling technique using a hot stage. A hollow fibrous separation membrane can be made by a melt spinning technique.

The extracting solvents useful in the present invention include alcohols such as ethyl alcohol and isopropyl alcohol; ketones such as acetone; aliphatic hydrocarbons such as normal hexane; and halogenated hydrocarbons such as hydrocarbon chloride, hydrocarbon fluoride, hydrocarbon chlorofluoride, and the like.

Referring now to FIG. 1, which shows a diagrammatical representation of an embodiment of the apparatus for preparing a hollow fibrous separation membrane according to the present invention, polyolefins and diluents are introduced into a mixer 2 in which they are melt blended. If necessary, the mixer pressure may be reduced by using a vacuum pump 7. In order to obtain a hollow structure, a spinneret 11 having a double nozzle system of outer and inner nozzles is used. Through the outer nozzle a melt blend solution is supplied at a constant flow rate by the aid of a gear pump 9 and, through the inner nozzle nitrogen 5 is supplied at a constant flow rate. The melt blend solution of a hollow fiber from the outer nozzle falls downwardly for a distance while being partially cooled and coagulated, and is then introduced into a coagulation bath 14, in which the blend is completely cooled and coagulated. During the course of melt spinning of the resulting hollow fibrous membrane, a coagulant may be used in cooling the melt blend solution. As the coagulant, a solvent for extracting the diluent may be used directly at room temperature to improve the extraction efficiency. After extracting the diluent, the extracting solvent used is evaporated out together with any remaining diluent to form a hollow fibrous separation membrane.

Figure 2A:
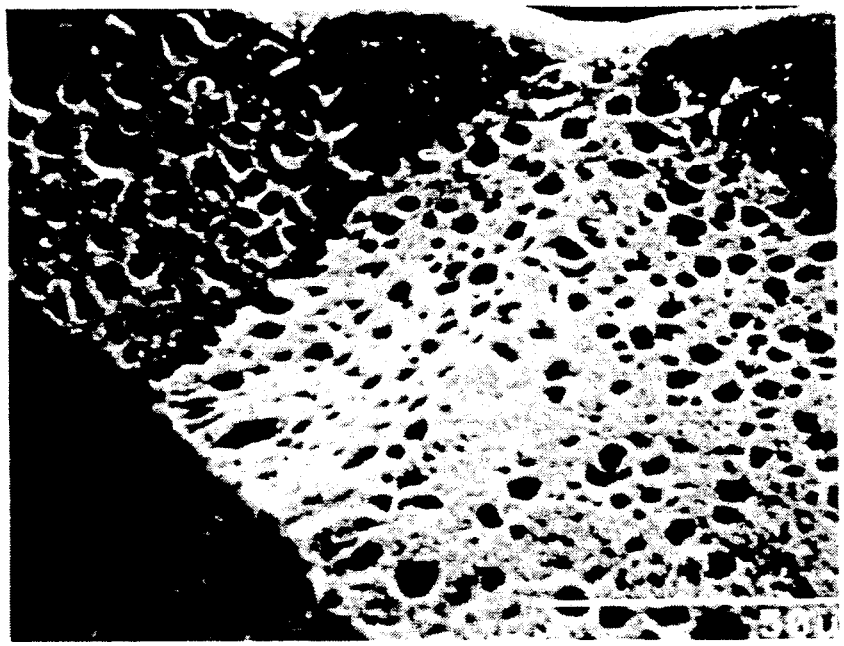
FIGS. 2(a) through 2(c) are photomicrographs showing cross-sectional views of the planar, porous membranes obtained by forming a planar film from a melt blend composed of 40% by weight of polypropylene and various types of diluents, and then cooling the resulting films at a cooling rate of 10° C. per minute.
Figure 2B:
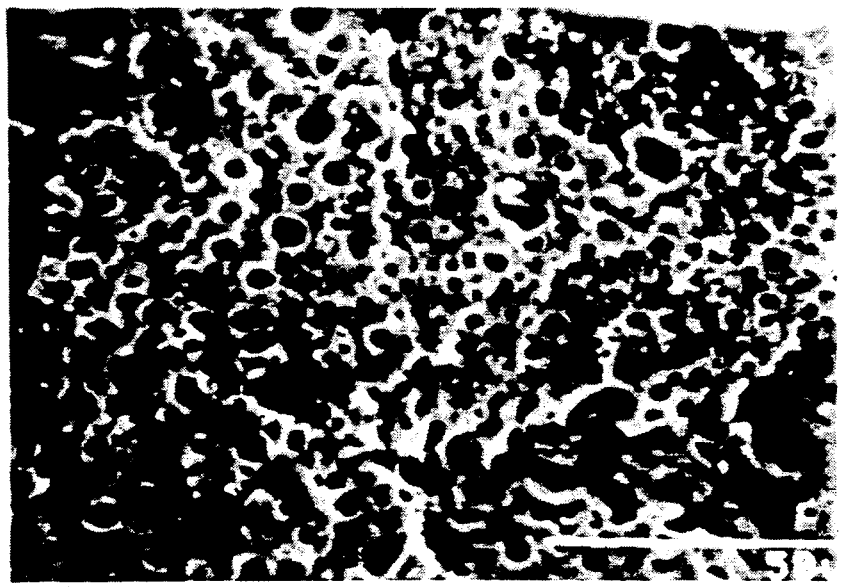
Figure 2C:
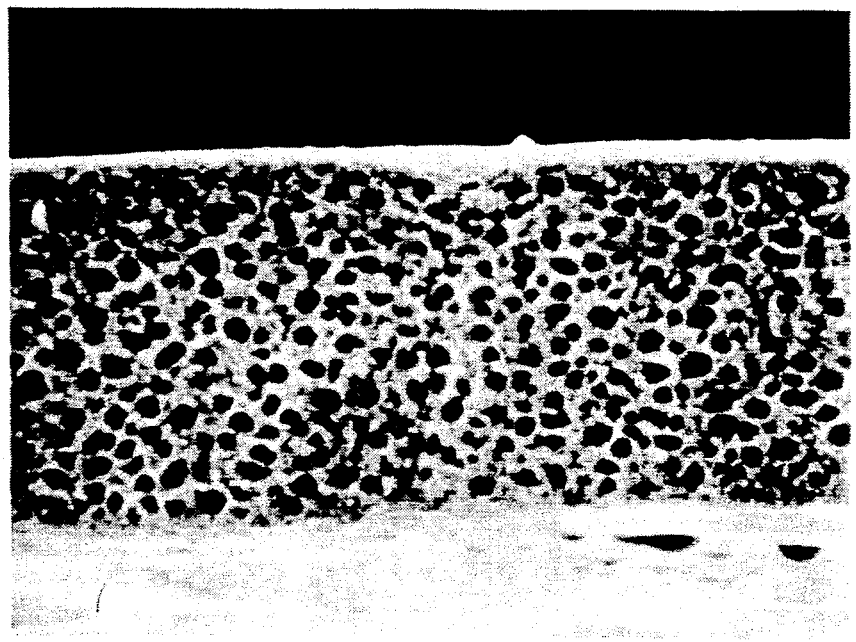
Figure 3A:
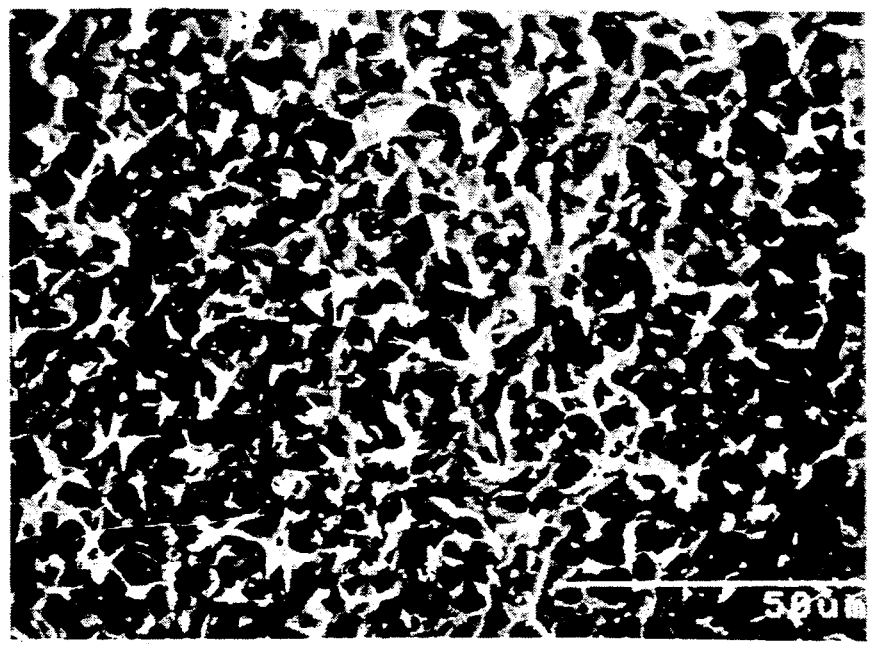
FIGS. 3(a) through 3(c) are photomicrographs showing cross-sectional views of the planar, porous membranes obtained by forming a planar film from a melt blend composed of 40% by weight of polypropylene and various types of diluents and then quickly cooling the resulting films in water at 25° C.
Figure 3B:
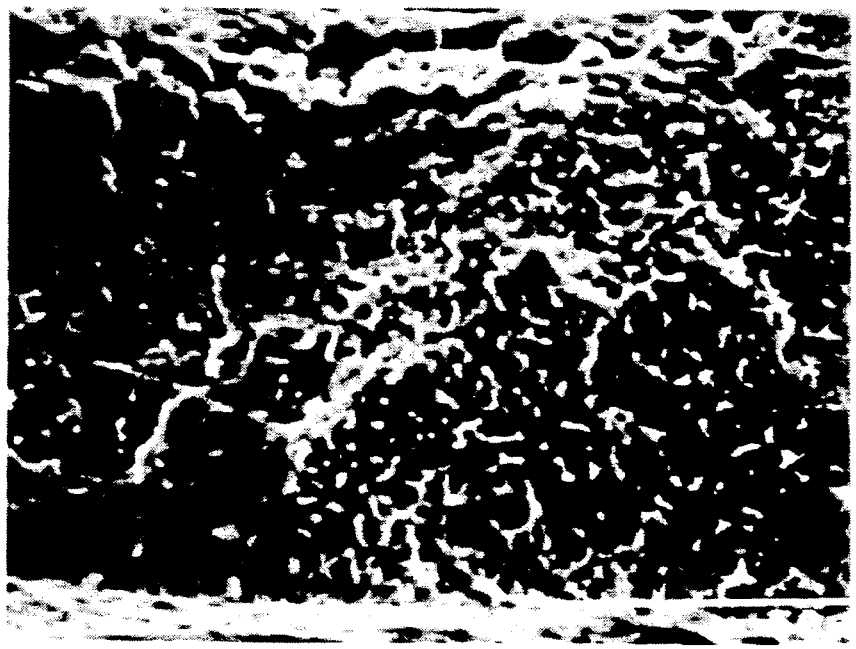
Figure 3C:
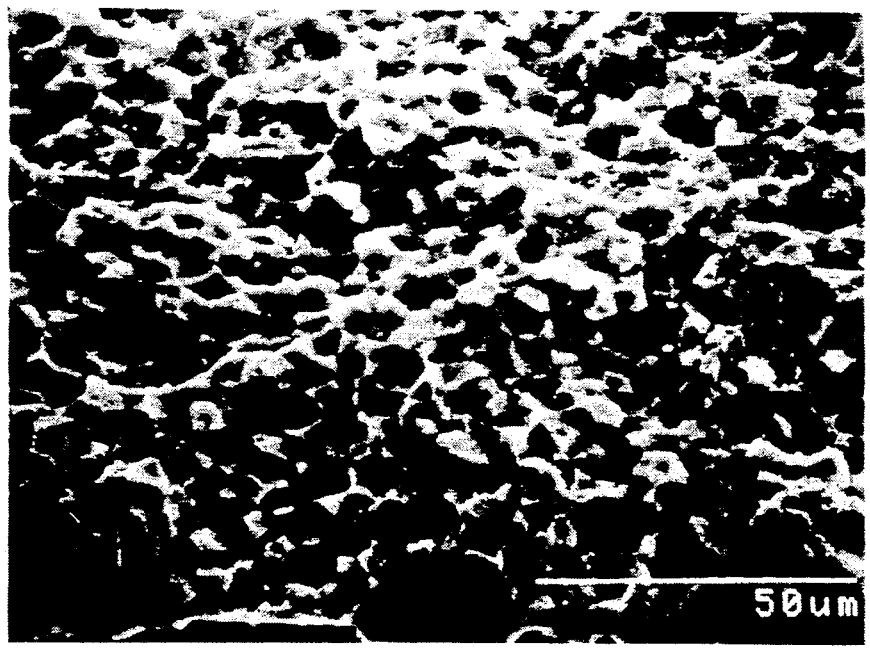

FIGS. 2(a) to 2(c) and FIGS. 3(a) to 3(c) show the changes in the pore sizes of the planar separation membranes obtained by forming planar films from polypropylene/diluent melt blends, and then cooling the resulting films at a constant cooling rate. In particular, FIGS. 2(a) to 2(c) show cross-sectional views of the membranes manufactured by using different kinds of diluents at a cooling rate of 10° C./min. FIGS. 3(a) to 3(c) show cross-sectional views of the membranes manufactured by using different kinds of diluents in water at 25° C. at a quick cooling rate. A comparison of FIGS. 2(a) to 2(c) with FIGS. 3(a) to 3(c) reveals that the membranes of FIGS. 3(a) to 3(c) have a larger pore size than those of FIGS. 2(a) to 2(c). Based on this result, it can be seen that in cases where the same diluents are used, the faster the cooling rate is, the smaller the size of the resulting membrane is.

Figure 4:
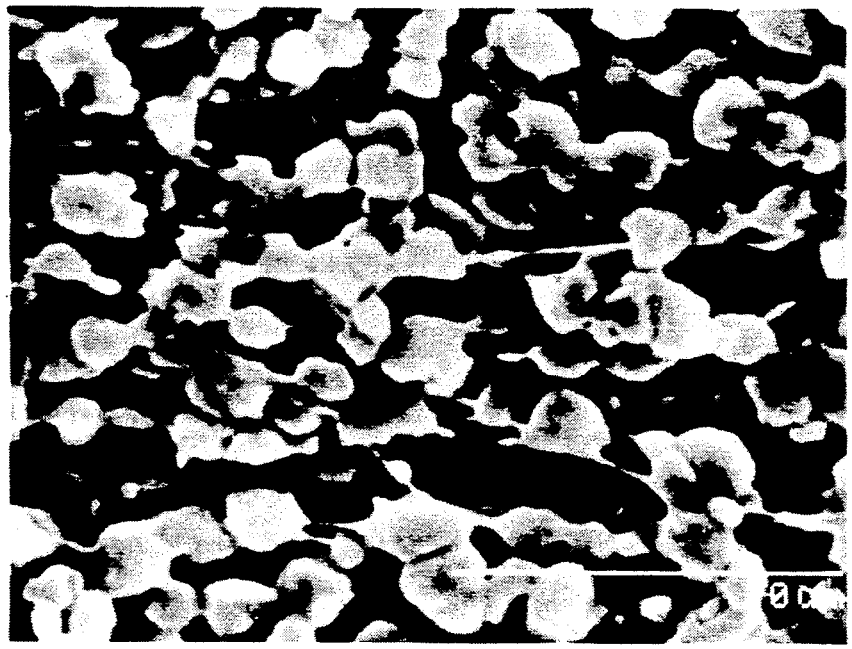
FIGS. 4(a) through 4(c) are photomicrographs showing the surface morphology of the hollow fibrous separation membranes manufactured from a melt blend composed of 20% by weight of polypropylene and various types of diluents.
Figure 4B:
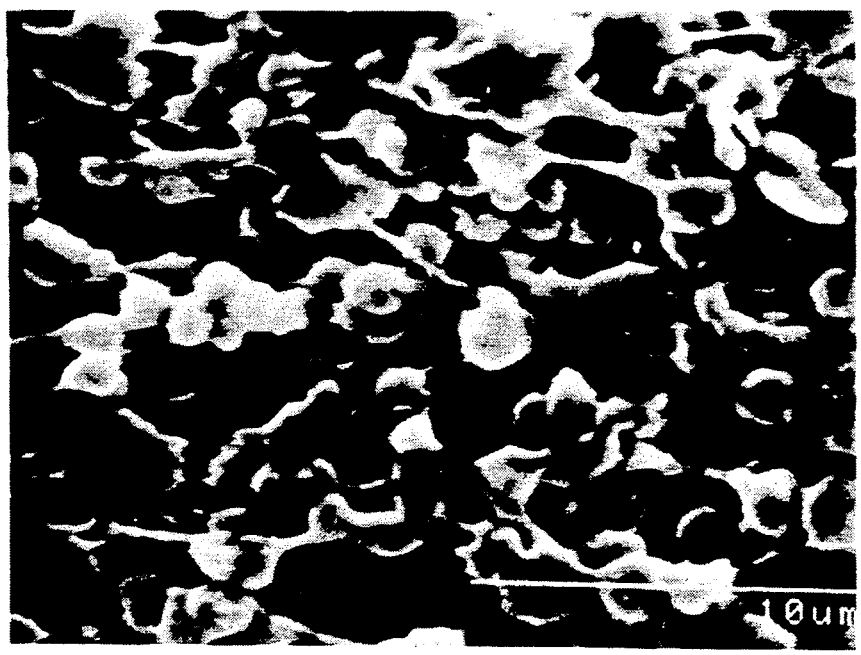
Figure 4C:
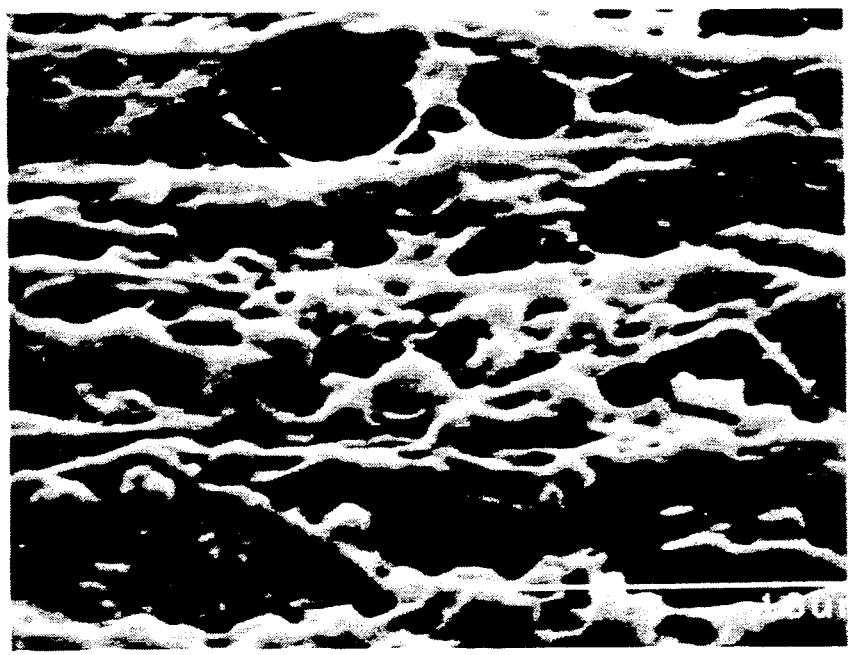

FIGS. 4(a) to 4(c) are photomicrographs showing the surface structures of the hollow fibrous separation membranes manufactured from melt blend solutions composed of 20% by weight of polypropylene and various types of diluents. As a diluent, oleic acid is used in FIG. 4(a); linoleic acid in FIG. 4(b); and natural soybean oil in FIG. 4(c), respectively. When soybean oil is used as a diluent, a highly-developed fibril structure is formed, resulting in an improvement in the mechanical strength of the resulting hollow fibrous separation membrane.

According to the present invention, the surface structures of hollow fibrous separation membranes can be altered by controlling the spinning rate when melt spinning the melt blend solutions composed of polyolefins and one of the diluents. In an embodiment for practicing the present invention, the spinning rate can be adjusted to 4.0 to 9.3 cm/min. by controlling the operation speed of an extruder motor 1 and a gear pump motor 8. The preferred winding rate is 57 m/min.

Figure 5A:
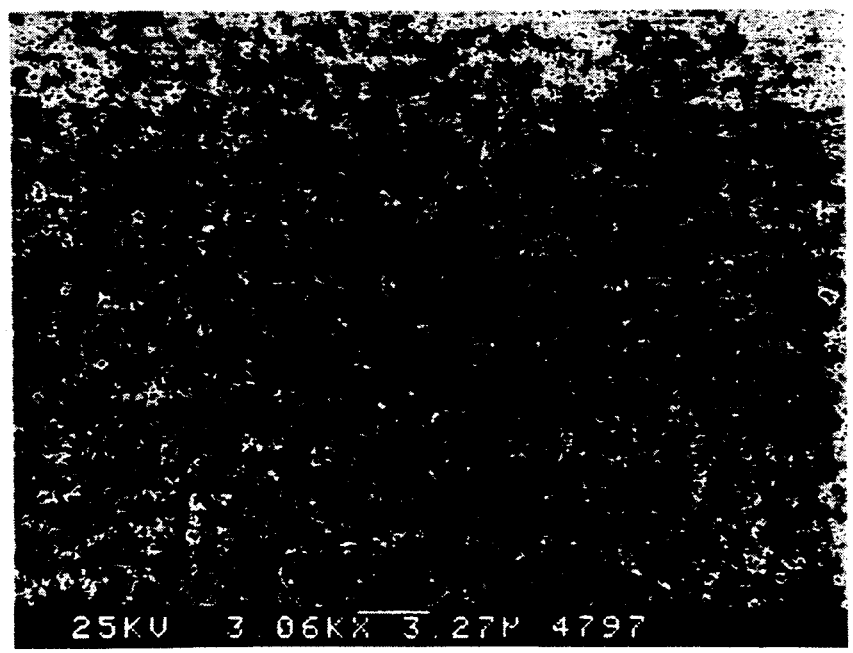
Figure 6A:
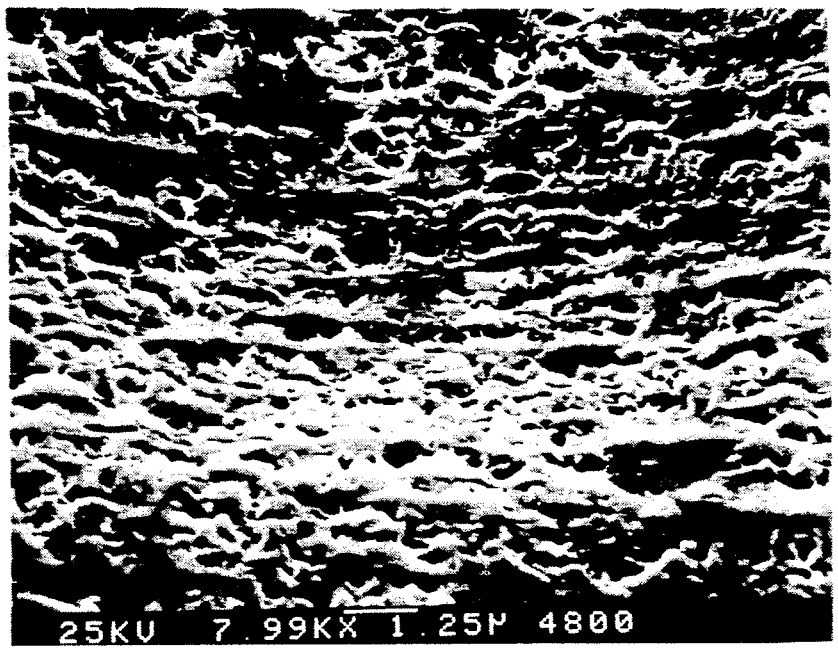
FIGS. 6(a) through 6(c) are surface photomicrographs of the hollow fibrous separation membranes manufactured from a melt blend composed of 70% by weight of polypropylene and soybean oil by varying winding ratios, which show the effect of the winding ratios on the surface structure of the membranes.
Figure 6B:
Figure 6C:
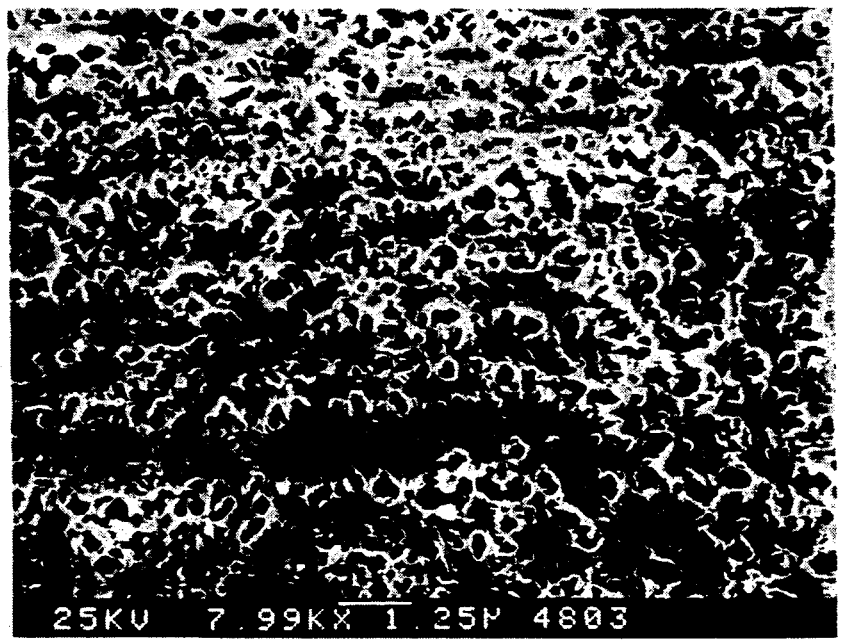
Figure 6D:
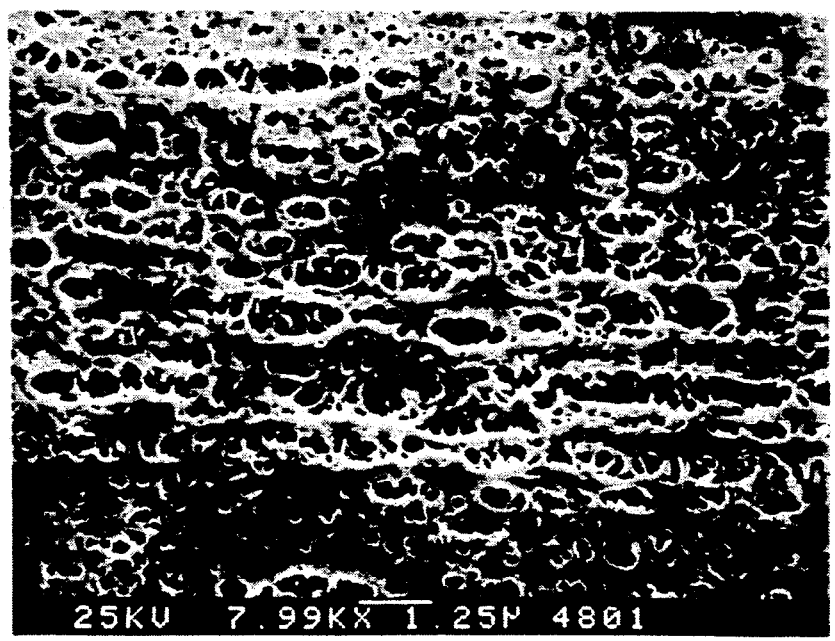

FIGS. 5(a) to 5(c) show the effect of various spinning rates on the pore sizes of the resulting hollow fibrous separation membranes. A melt blend solution composed of 40% by weight of polypropylene and soybean oil was subject to melt spinning at the spinning rates of 5.3, 6.6, and 9.3 cm/min. The results are shown in FIGS. 5(a) to 5(c), respectively. From these figures, it can be noted that the pore size formed on the surface of the membrane becomes larger as the spinning rate is raised.

The inventors of the present invention have also found that it is possible to considerably promote the formation of secondary pores and the surface porosity of the membrane in the fibril structure by controlling the winding ratio of a winding device 15 within the range of 10–3,500. The winding ratio is written as follows:

$$\text{Winding ratio} = \frac{\text{Winding rate}}{\text{Spinning rate}}$$

As can be seen from FIGS. 6 and 8, by varying the winding ratio within the range of 10 to 3,500 at a spinning temperature of 165° to 220° C. and a spinning rate of 8 cm/min, the formation of the secondary pores and the surface porosity of the membrane can be improved.

Figure 8A:
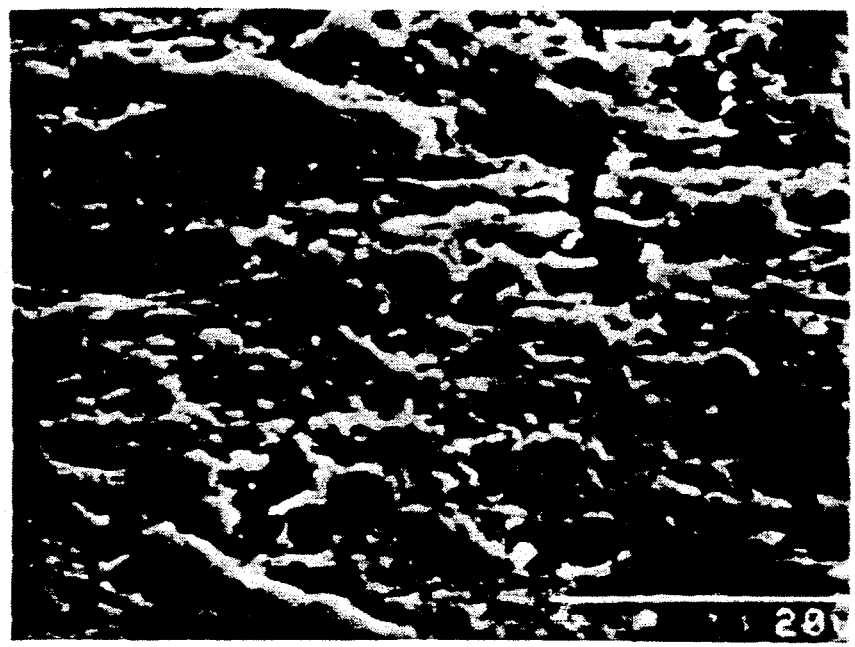

FIGS. 6(a) to 6(d) and FIGS. 8(a) and 8(c) show the effect of the various winding ratios on the surface structures of the hollow fibrous separation membranes. FIGS. 6(a) to 6(d) are photomicrographs of the surfaces of the membranes which are manufactured by winding a melt blend solution composed of 70% by weight of polypropylene and soybean oil at a winding ratio of 500, 750, 1000, and 1250, respectively. FIGS. 8(a) to 8(c) are photomicrographs of the surfaces of the membranes which are obtained by winding a melt blend solution composed of 30% by weight of polyethylene and soybean oil at a winding ratio of 350, 450, and 600, respectively. From the results shown in these figures, it can be seen that the higher the winding ratio is, the better the secondary fibril structure with the larger pore size of the membrane is formed, while the inner and outer diameters of the membrane decrease.

After the melt spinning of the hollow fibrous separation membrane and extracting the diluent, the spun membrane is subject to reelongation at an rate of 20% to 250% and treated at a temperature below the melting point of polyolefins to improve the porosity on the surface and the inside of the membrane. For example, a hollow fibrous separation membrane prepared from a melt blend solution composed of 50% by weight of polypropylene and soybean oil under the following conditions: spinning temperature of 165° to 220° C.; spinning rate of 8 cm/min; and winding ratio of 900, is subject to reelongation at ambient temperature. By way of this reelongation, the porosity of the membrane can be significantly improved without causing a change in the outer and the inner diameters of the membrane.

Figure 7A:
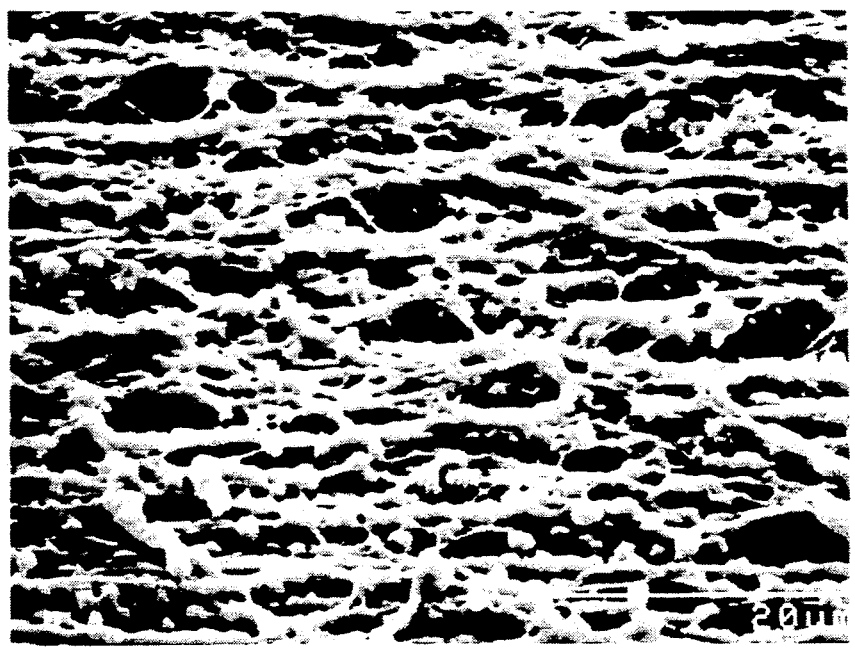
FIGS. 7(a) through 7(c) are surface photomicrographs of the hollow fibrous separation membranes manufactured from a melt blend composed of 50% by weight of polypropylene and soybean oil by varying reelongation ratios, which show the changes in the surface structure and porosity of the membranes before and after preforming reelongation.
Figure 7B:
Figure 7C:
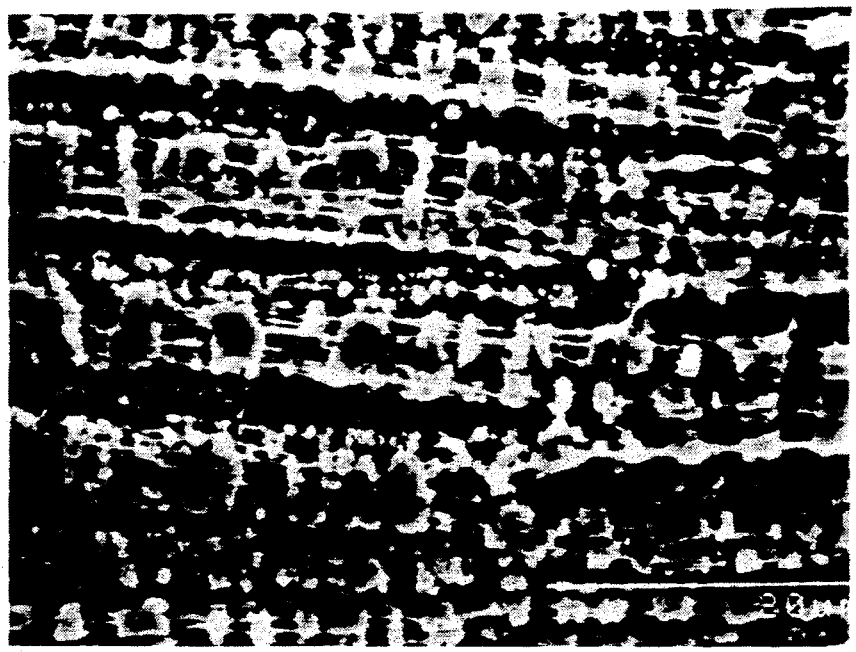

The changes in the surface structure of the hollow fibrous separation membrane before and after the reelongation are illustrated in FIGS. 7(a) to 7(c). FIG. 7(a) is a surface photomicrograph of the membrane which was not subject to the reelongation step. FIGS. 7(b) and 7(c) are surface photomicrographs of the membranes which were reelongated by 50% and 100%, respectively. From the foregoing, it can be seen that the maximum pore size of the membrane is increased as the reelongation rate increases.

In addition, it has been confirmed that the pore size of the hollow fibrous separation membrane varies depending on the type of the extracting solvent used.

The hollow fibrous separation membrane according to the present invention is 100 to 500 μm in inner diameter and 10 to 100 μm in thickness. Determination by the electromicroscopic method, the bubble point method (ASTM F316-80 and E128-61), and the like reveal that the membrane of the invention has a pore size ranging from 0.1 to 20 μm.

DESCRIPTION OF THE PREFERRED EMBODIMENT

The present invention will be illustrated in greater detail by way of the following examples. The examples are presented for illustrative purpose only and should not be construed as limiting the scope of the present invention, which is properly delineated in the claims.

EXAMPLE 1

Preparation of Planar, Porous Polypropylene Separation Membranes Having a Cellular Structure A mixture of 40% by weight of polypropylene in oleic acid diluent was molten and blended at a temperature of 165° to 220° C. to give a melt blend solution. The resulting solution was formed into a film of about 100 μm in thickness. The film thus formed was cooled on a hot stage at a cooling rate of 10° C./min. Then, the diluent was extracted with FREON 113 as an extracting solvent to give a planar separation membrane.

The same procedures as described above were repeated using each of linoleic acid and soybean oil as a diluent to produce planar separation membranes. Photomicrographs of the resulting membranes are illustrated in FIGS. 2(a) to 2(c), which show that all the resulting membranes are in the form of cellular structure. This cellular structure is deemed to have been accrued by the development of each of the cells which were formed via a liquid-liquid phase separation of the melt blend solutions of polypropylene and a diluent, and is inherent to a liquid-liquid phase separation system.

EXAMPLE 2

Preparation of Planar, Porous Polypropylene Separation Membranes Having a Microcellular Structure The same procedure as described in Example 1 was repeated, except that the rapid cooling in water at 25° C. of the formed films was carried out in place of the slow cooling on a hot stage. Photomicrographs of the membranes thus obtained are illustrated in FIGS. 3(a) to 3(c), which show that upon rapid cooling, the liquid-liquid and the solid-liquid phase separations occurred simultaneously to afford a microcellular structure to the membranes. When oleic acid or soybean oil was used as a diluent, bead-like polypropylene spherulites were formed. From a comparison of FIGS. 3(a) to 3(c) with FIGS. 2(a) to 2(c), it can be seen that it is possible to change the phase separation mechanism and the pore structure of the resulting membranes by adjusting the cooling rate.

EXAMPLE 3

Preparation of Hollow, Fibrous Porous Polypropylene Separation Membranes Using Each Diluent A hollow, fibrous membrane was prepared from a melt blend solution composed of 20% by weight of polypropylene in oleic acid diluent under the following conditions: spinning temperature of 165°-220° C.; spinning rate of 8 cm/min; and winding ratio of 900. In this procedure, FREON 113 was employed as a coagulating and extracting agent. The same procedure was repeated under the same conditions, except that linoleic acid or soybean oil was used as a diluent.

FIGS. 4(a) to 4(c) illustrate photomicrographs of the resulting membrane samples 1, 2, and 3, respectively, which reveal that all the membranes have a porous, micro-cellular structure of bead-like polypropylene spherulites. When oleic acid or linoleic acid was used as a diluent, there was found no substantial differences between the structures, whereas it was found that when soybean oil was used as a diluent, a well-developed fibril structure could be formed. This well-developed fibril structure rendered considerable improvement in the mechanical strength of the resulting hollow, fibrous separation membrane.

EXAMPLE 4

Controlling of Pore Sizes in a Hollow, Fibrous Polypropylene Separation Membrane by Changing the Spinning Rate The procedure of Example 3 was repeated, except that a melt blend solution composed of 40% by weight of polypropylene in soybean oil was melt spun at various spinning rates ranging from 4.0 to 9.3 cm/min. The spinning temperature was fixed at a temperature ranging 165° to 220° C. and the winding rate at 57 m/min. FREON 113 was used as a coagulating and extracting agent. As shown in FIGS. 5(a) to 5(c), it can be noted that the pore sizes of the resulting membranes become larger as the spinning rate increases.

EXAMPLE 5

Controlling of Porous Structure of a Hollow, Fibrous Polypropylene Separation Membrane by Changing the Winding Ratio The procedure of Example 3 was repeated, except that a melt blend solution composed of 70% by weight of polypropylene in soybean oil and various winding ratios were used. The spinning temperature and rate were fixed at a temperatures of 165° to 220° C. and 8 cm/min, respectively. FREON 113 was used as a coagulating and extracting agent. Photomicrographs of the resulting membranes presented as FIGS. 6(a) to 6(c), which show that the higher the winding ratio was, the larger the pore size on the surface of the membrane was. The pore was transformed into an oval figure and the degree of orientation became higher as the winding ratio increased. Bubble points of the resulting membranes were determined by immersing them into a 40% aqueous ethyl alcohol solution. The results reveal that the bubble point is lowered, the maximum pore size incresed, and the outer and the inner diameters of the membrane reduced, as the winding ratio increases within the range of 500 to 1250. The results are summarized in Table 1 below.

TABLE 1

| Winding ratio | Bubble print (Kg/cm$^2$) | Maximum pore size diameter($\mu$m) | Inner diameter ($\mu$m) | Outer diameter ($\mu$m) |
| --- | --- | --- | --- | --- |
| 500 | 1.0 | 1.1 | 350 | 420 |
| 750 | 0.7 | 1.7 | 250 | 325 |
| 1,000 | 0.5 | 2.3 | 240 | 320 |
| 1,250 | 0.2 | 5.9 | 200 | 260 |

EXAMPLE 6

Formation of Secondary Porous Structure by Reelongation

Hollow fibrous separation membranes were prepared from a melt blend solution composed of 50% by weight of polypropylene in soybean oil according to the procedure of Example 3 under the following conditions: spinning temperature of 165° to 220° C.; spinning rate of 8 cm/min; and winding ratio of 900. FREON 113 was used as a coagulating and extracting agent. After extracting the diluent, the resulting membrane was reelongated by 20 to 250% at room temperature. FIGS. 7(a) to 7(c) illustrate a comparison of the changes in the structure of the membranes after the reelongation. From these figures, it can be noted that the porosity of the membranes increases and the fibril structures of the same membranes are also notably increase on the surface and the inside thereof. In order to investigate the increase of the pore sizes owining to the reelongation, the reelongated membranes were immersed into a 40% aqueous ethyl alcohol solution and the bubble point was determined.

The results are summarized in Table 2 below. From the data in Table 2, it can be seen that the higher the reelongation ratio is, the lower the bubble point is and the larger the maximum pore size is. In addition, there were little changes in the inner and the outer diameters of the membranes before and after the reelongation.

TABLE 2

| Reelongation ratio (%) | Bubble print (Kg/cm$^2$) | Maximum pore size ($\mu$m) | Inner diameter ($\mu$m) | Outer diameter ($\mu$m) |
| --- | --- | --- | --- | --- |
| 0 | 0.40 | 2.9 | 212 | 278 |
| 50 | 0.33 | 3.6 | 195 | 255 |
| 100 | 0.25 | 4.7 | 192 | 252 |

EXAMPLE 7

Changes in the Porous Structure Depending on the Type of an Extracting Solvent

According to the same procedure as described in Example 3, a series of hollow, fibrous separation membranes were prepared from a melt blend solution composed of 50% by weight of polypropylene in soybean oil. The spinning temperature was 165° to 220° C., the spinning rate 8 cm/min, and the winding ratio 1000. Ethyl alcohol, isopropyl alcohol, acetone, normal hexane, and FREON 113 were used as a coagulating and extracting agent.

The bubble points of the resulting membranes were determined by immersing them into a 30% aqueous ethyl alcohol solution. The results are summarized in Table 3 below. The data in Table 3 reveal that the maximum pore size increases in the order of ethyl alcohol, isopropyl alcohol, acetone, normal hexane, and FREON 113.

TABLE 3

| Extracting solvent | Bubble print (Kg/cm$^2$) | Maximum pore size ($\mu$m) |
| --- | --- | --- |
| Ethyl alcohol | 2.0 | 0.6 |
| Isopropyl alcohol | 1.7 | 0.7 |
| Acetone | 1.3 | 0.9 |
| Normal hexane | 0.4 | 3.0 |
| FREON 113 | 0.3 | 3 5 |

EXAMPLE 8

Controlling of Porous Structures of Hollow, Fibrous Polyethylene Separation Membranes by Changing the Winding Ratios The procedure of Example 3 was repeated using a melt blend solution composed of 30% by weight of polyethylene in soybean oil, except for varying the winding ratio within the range of 350 to 600. The spinning temperature was fixed at a temperature of 165° to 220° C., and the spinning rate was 15 cm/min. FREON 113 was used as a coagulating and extracting agent.

FIGS. 8(a) to 8(c) illustrate photomicrographs of the hollow, fibrous separation membranes prepared at different winding ratios of 350, 450, and 600, respectively. These figures reveal that as the winding ratio increases, the fibril structures are formed and the shape of the pores becomes to an oval. The pore size and the porosity of the membrane are also somewhat increased. The bubble point was determined by immersing the resulting membranes into a 40% aqueous ethyl alcohol solution.

The results are listed in Table 4 below. The data in Table 4 reveal that the bubble point is lowered and the maximum pore size increased as the winding ratio raises.

TABLE 4

| Winding ratio | Bubble Point (Kg/cm$^2$) | Maximum pore size ($\mu$m) | Inner diameter ($\mu$m) | Outer diameter ($\mu$m) |
|---|---|---|---|---|
| 350 | 0.35 | 3.4 | 300 | 400 |
| 450 | 0.32 | 3.7 | 280 | 380 |
| 600 | 0.24 | 5.0 | 250 | 350 |

What is claimed is:

1. A process for preparing a hollow, fibrous, porous polyolefin separation membrane, which comprises:
   a) spinning a melt blend solution of a polyolefin, having a melt index of 0.1 to 30 g/10 min., selected from the group consisting of polyethylene and polypropylene, in a diluent selected from the group consisting of natural soybean oil, pure linoleic acid, and a mixture of oleic acid, linoleic acid and palmitic acid to form a hollow, fibrous, porous, polyolefin separation membrane;
   b) extracting out the diluent followed by coagulating the membrane with a coagulating and extracting solvent; and
   c) evaporating out the solvent together with any residue of the diluent.

2. The process of claim 1, wherein the melt blend solution contains the polyolefin in an amount of 10 to 80% by weight.

3. The process of claim 1, wherein the coagulating and extracting solvent is selected from the group consisting of alcohols, ketones, aliphatic hydrocarbons, and halogenated hydrocarbons.

4. The process of claim 3, wherein the alcohols are selected from the group consisting of ethyl alcohol and isopropyl alcohol.

5. The process of claim 3, wherein the ketone is acetone.

6. The process of claim 3, wherein the aliphatic hydrocarbon is normal hexane.

7. The process of claim 1, wherein the halogenated hydrocarbons are selected from the group consisting of hydrocarbon chlorides, hydrocarbon fluorides and hydrocarbon chlorofluorides.

8. The process of claim 1, wherein the spinning step is carried out by using a spinneret with a double nozzle structure having an outer nozzle through which the melt blend solution is supplied at a constant flow rate by the aid of a gear pump and an inner nozzle through which nitrogen gas is supplied at a constant flow rate resulting in the formation of a hollow structure in the membrane.

9. The process of claim 1, wherein the melt spinning step is carried out at a controlled spinning rate in the range of 4.0 to 9.3 m/min to control pore size on a surface of the membrane.

10. The process of claim 1, wherein the melt spinning step is carried out at a controlled winding ratio within the range of 500 to 1200 resulting in the formation of a fibril structure within the resulting porous membrane and improvements of the porosity thereof.

11. The process of claim 1, wherein the step of extracting the diluent is followed by a step of reelongation of the membrane at a ratio of 20 to 250%, thereby improving the porosity on a surface and inside of the resulting membrane without causing a change in the outer and the inner diameters of the membrane.

12. The process of claim 11, wherein the resulting membrane has an inner diameter of 100 to 500 $\mu$m, a thickness of 10 to 100 $\mu$m, and a pore size of 0.1 to 20 $\mu$m.

* * * * *